Aug. 20, 1968    A. PRICHODJKO ET AL    3,398,268
NAVIGATION SYSTEM OPERATING ON THE TRANSIT TIME PRINCIPLE
Filed July 8, 1963    13 Sheets-Sheet 11
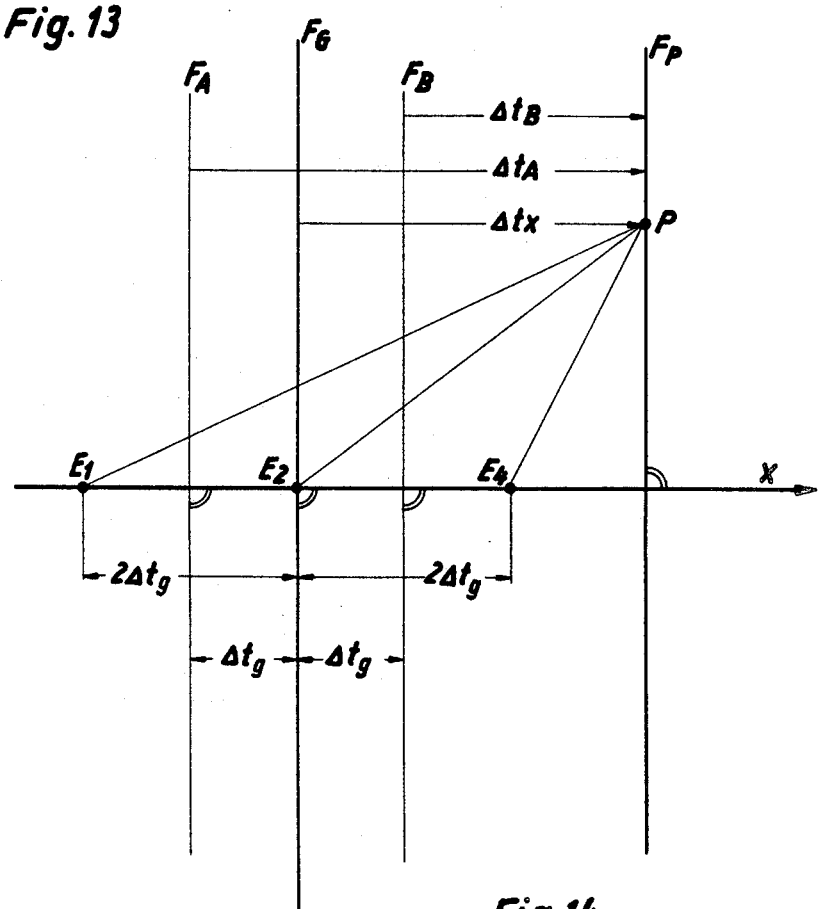
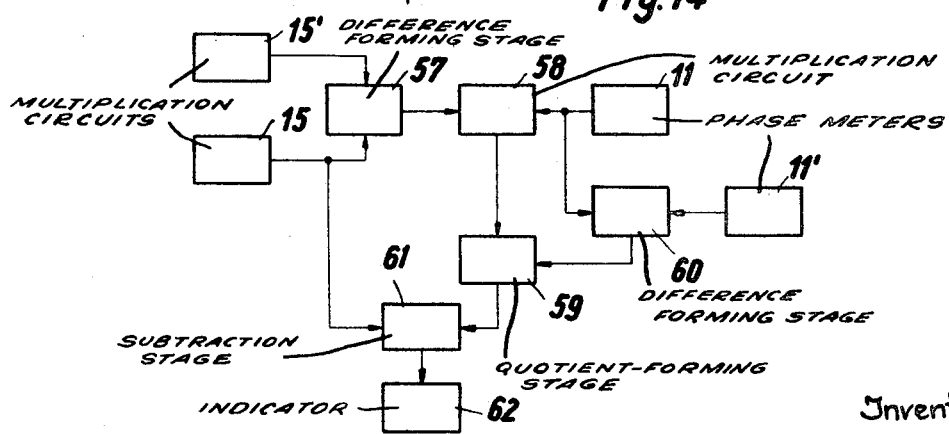
Inventors:
Alexander Prichodjko
Albert Simianer
Hartmut Hipp
By: Spencer & Kaye
Attorneys

United States Patent Office 3,398,268
Patented Aug. 20, 1968

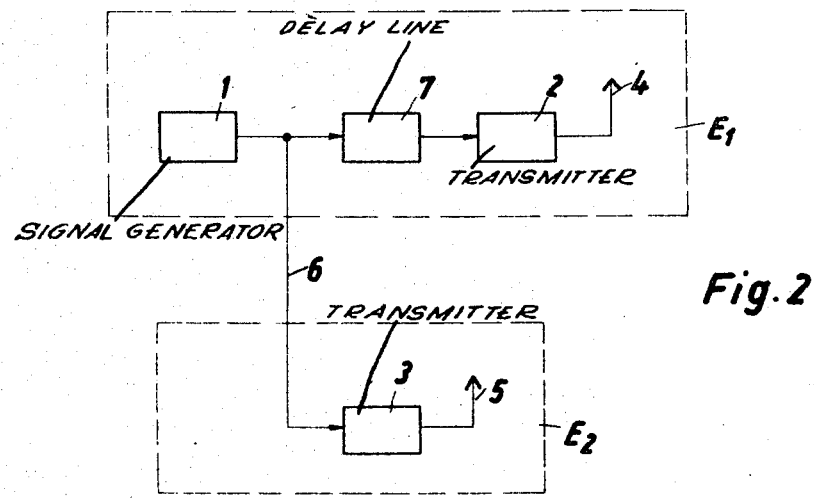
Fig. 2
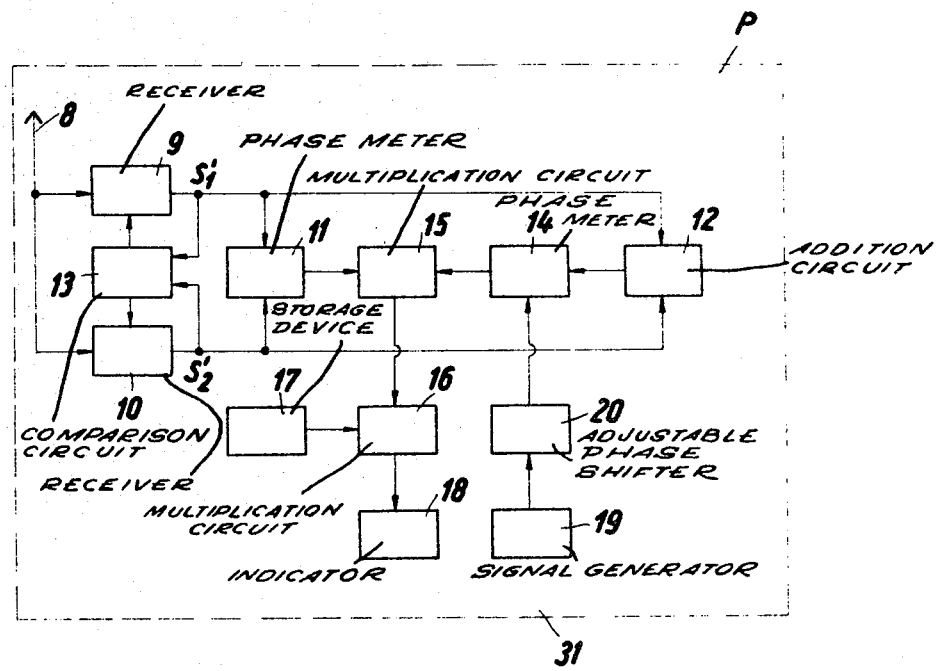

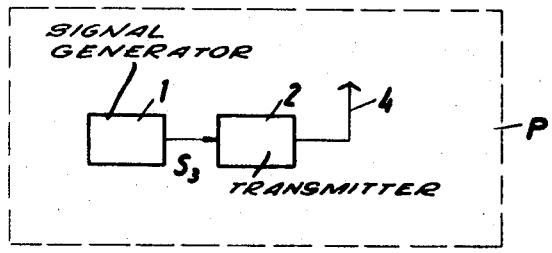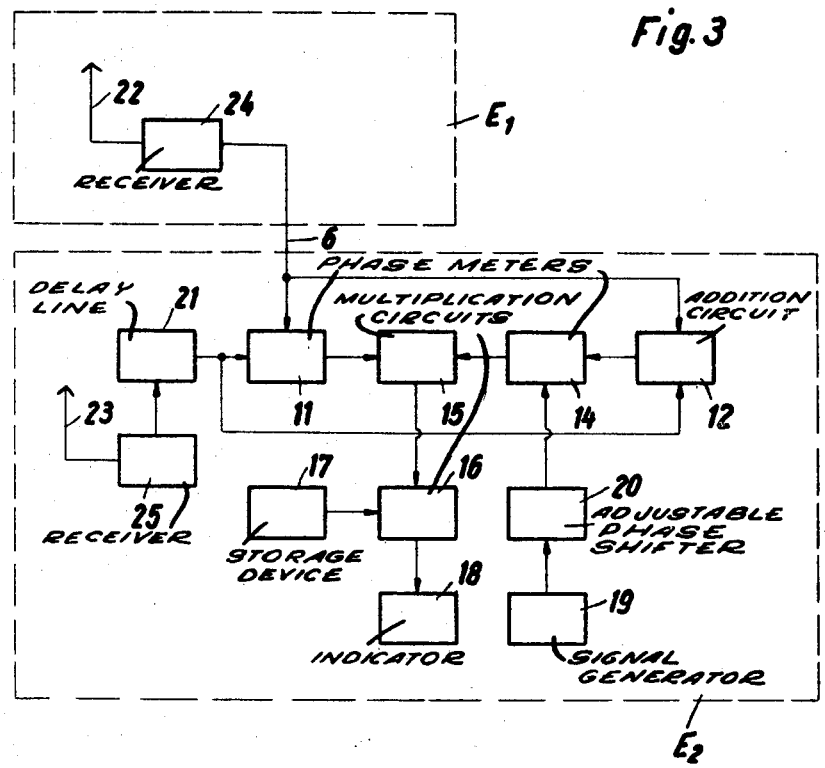
Fig. 3

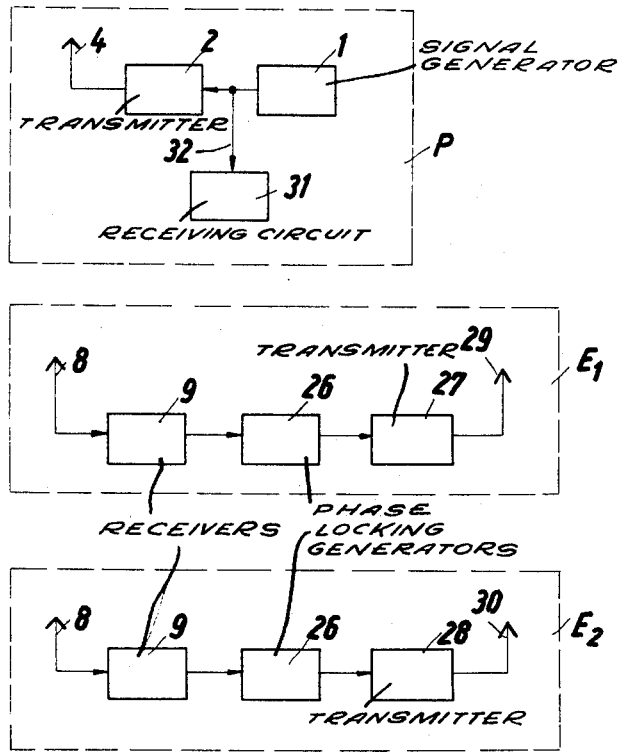
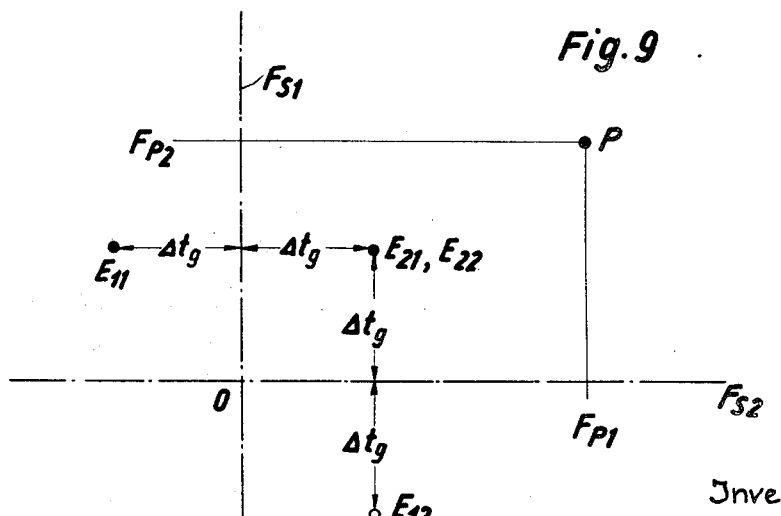
Fig. 4
Fig. 9

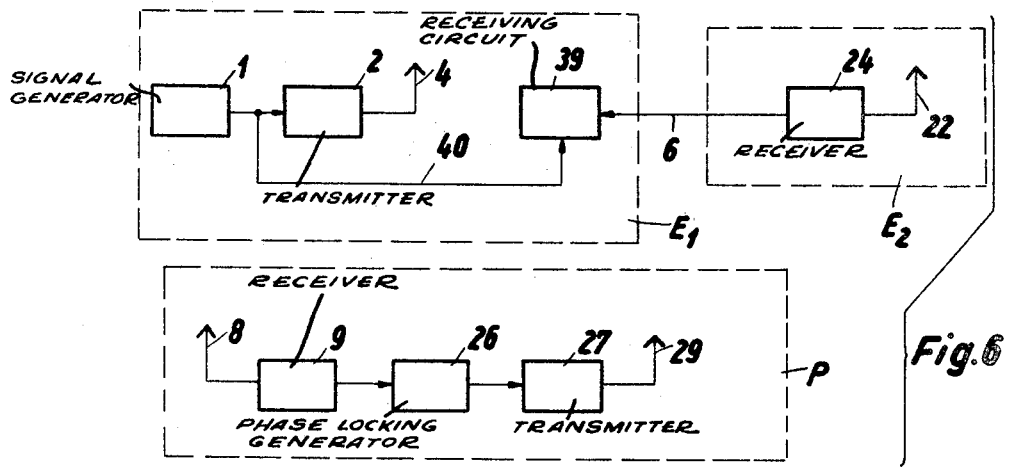
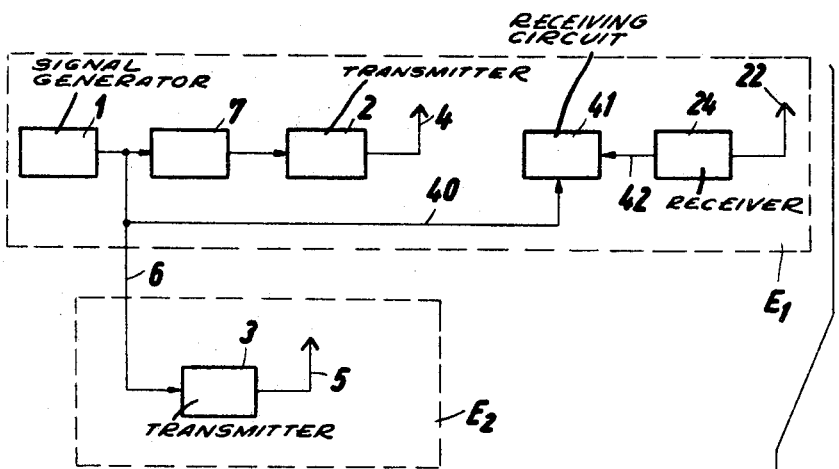
Fig. 6
Fig. 7

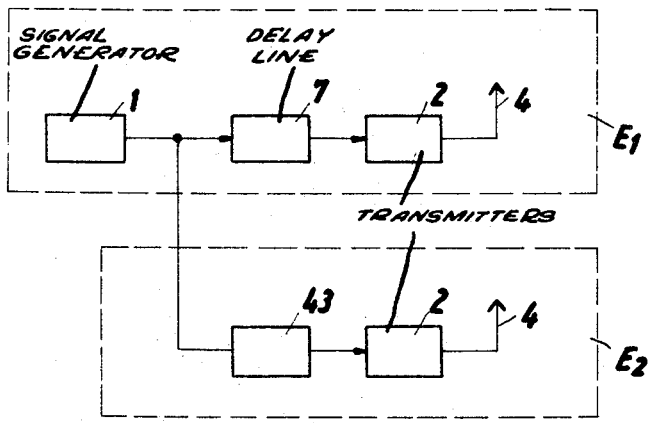
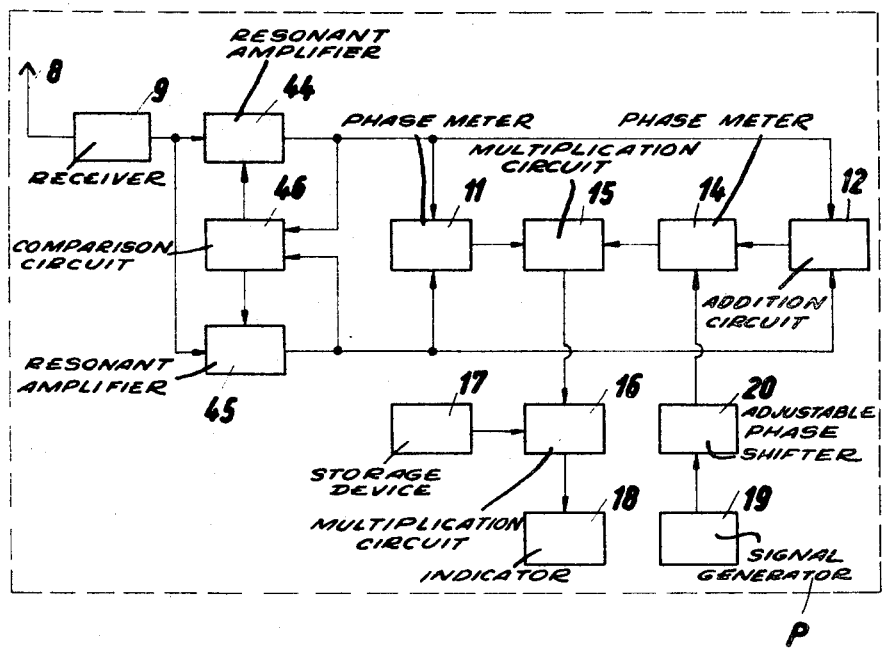
Fig. 10

3,398,268
NAVIGATION SYSTEM OPERATING ON THE
TRANSIT TIME PRINCIPLE
Alexander Prichodjko, Oberelchingen, Kreis Neu-Ulm, Albert Simianer, Thalfingen, Kreis Neu-Ulm, and Hartmut Hipp, Gerlingen, Kreis Leonberg, Germany, assignors to Telefunken Patentverwertungs-G.m.b.H., Ulm (Danube), Germany
Filed July 8, 1963, Ser. No. 293,481
Claims priority, application Germany, July 6, 1962, T 22,420; Sept. 19, 1962, T 22,757
23 Claims. (Cl. 235—150.27)

The present invention relates to a system operating on the transit time principle for determining the distance which a positional plane, containing a point whose position is to be determined, is spaced from the plane of symmetry of two points whose position is known and which themselves are spaced a known distance from each other, as well as the particular side of the plane of symmetry on which the positional plane is located.

It is the primary object of the present invention to provide a system for producing, measuring and utilizing, for navigational purposes, a family of mutually parallel positional planes, which system is composed of simple parts that, by themselves, are well known, and which system can be used by many participants to enable them to plot their own positions. The system itself is not limited to actual navigation, including aerial navigation, as understood in the ordinary sense, but is suitable for all measuring purposes in which the positions of various targets and objects are determined and plotted, as, for example, in the science of geodesy.

According to the present invention, there is provided a system operating on the transit time principle for determining both the distance which a positional plane $F_P$, containing a point P whose position is to be determined, is spaced from the plane of symmetry $F_S$ of two transmitter points $E_1$ and $E_2$ whose positions are known and which themselves are spaced a known distance from each other, as well as the particular side of the plane of symmetry on which the positional plane is located. This system incorporates the following basic features, or their equivalents, as will be described below:

(1) The two transmitter points send out signals of the same frequency and of the same phase, which signals are modulated onto carriers of different frequency.

(2) At the receiver end, a reference signal is produced whose frequency is the same as that of the transmitted signal, the phase of which reference signal is the same as the phase of the transmitted signals at the time they are sent out.

(3) The signals transmitted from the two transmitter points are demodulated and a first phase difference between the two received signals is determined.

(4) A second phase difference is determined between the reference signal and the sum signal obtained from the two received signals, after their demodulation and amplification to approximately equal amplitudes.

(5) A product is formed by multiplying the first and second phase differences.

All that is then necessary in order to obtain from this product, which is proportional to the distance between the positional plane containing the point P, the distance expressed in predetermined units of length, e.g., kilometers, is to multiply the product by a factor $$Q = \frac{c}{4\pi^2 \cdot \Delta t_g \cdot f_1{}^2}$$

where $c$ is the propagation velocity of the signal, $\Delta t_g$ is equal to the transit time corresponding to half the distance which the points $E_1$ and $E_2$ are spaced from each other, i.e., the time interval which it would take a signal to travel half the distance between $E_1$ and $E_2$, and $f_1$ is the frequency of the signals.

Additional objects and advantages of the present invention will become apparent upon consideration of the following description when taken in conjunction with the accompanying drawings in which:

FIGURE 2 is a block diagram of one embodiment of a system according to the present invention.

FIGURE 3 is a block diagram of another embodiment of a system according to the present invention.

FIGURE 4 is a block diagram of a third embodiment of a system according to the present invention.

FIGURE 6 is a block diagram of a fifth embodiment of a system according to the present invention.

FIGURE 7 is a block diagram of a sixth embodiment of a system according to the present invention.

FIGURE 9 is a plan view of a transmitting plane in which there are three fixed stations arranged in accordance with the present invention to give a complete plot of the position of P.

FIGURE 10 is a block diagram showing a seventh embodiment of a system according to the present invention.

FIGURE 13 is a plan view of a transmitting plane and shows a simplification of the arrangement depicted in FIGURE 11, there being but three transmitting stations.

FIGURE 14 is a block diagram of a modified component incorporated in a system according to the present invention.

Figure 1:
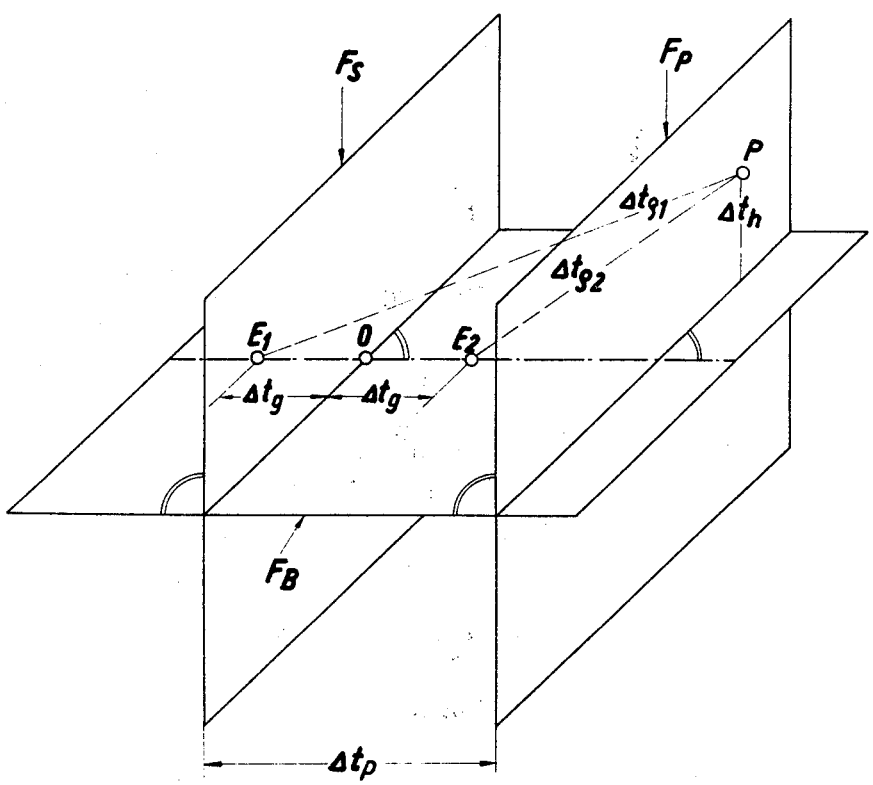
FIGURE 1 is a perspective representation showing the relative position of the transmitting and receiving points, as well as a positional and a reference plane.

Referring now to the drawings and to FIGURE 1 thereof in particular, the same shows the positional plane $F_P$ containing the point P whose position is to be determined. By definition, all points on the plane of symmetry $F_S$ are spaced equidistantly from the two transmitter points $E_1$ and $E_2$, the line joining these two points and passing through O, whereat it intersects plane $F_S$, lying in a horizontal plane $F_B$. The distance between O and each of points $E_1$ and $E_2$ is such that the transit time of a signal is $\Delta t_g$. The distance between $E_1$ and P is such that the transit time of a signal is $\Delta t_{p1}$, the distance between $E_2$ and P is such that the transit time of a signal is $\Delta t_{p2}$, and the elevation of P above plane $F_B$ is such that the transit time of a signal is $\Delta t_h$. The object of the present invention is to determine the transit time $\Delta t_p$ which corresponds to the distance between planes $F_P$ and $F_S$, the algebraic sign of $\Delta t_p$ being indicative of which side of the plane $F_S$ the plane $F_P$ is located. It will be assumed that when the points are located as shown in FIGURE 1, wherein $\Delta t_{p1}$ is greater than $\Delta t_{p2}$, $\Delta t_p$ is positive.

Referring now to FIGURE 2, the same is a block diagram showing the component parts of the stations located at points $E_1$, $E_2$ and P, the stations at $E_1$ and $E_2$ being transmitters and the station at P a receiver. Here it will be assumed, for purposes of simplification, that, in all three stations, the signals will not undergo any phase shifts other than those which are purposely produced and described. Signal generator 1 at $E_1$ produces signals which are modulated onto the different carrier frequencies of transmitters 2 and 3, located at $E_1$ and $E_2$, respectively, the output of these transmitters being applied to transmitting antennas 4 and 5, respectively. The signal is applied from generator 1 to transmitter 3 via a transmission line 6 which delays the signal by a time interval equal to $2\Delta t_g$ ($\Delta t_g$ being the time interval it takes for the signal to travel but half the distance between the two stations $E_1$ and $E_2$), and to transmitter 2 via a delay line 7 which is matched to the transmission line 6 so as likewise to delay the signal by a time interval equal to $2\Delta t_g$. Consequently, the signals transmitted from $E_1$ and $E_2$, whereat they are modulated onto carriers of different frequency, will be sent out so as to be of the same frequency and in phase with each other. The frequency and phase of the modulation signal, at the instant at which the same is transmitted from $E_1$ and $E_2$, is the same as the frequency and phase of a reference signal produced by a signal generator 19 located at P. At the instant at which the modulation signal is transmitted from $E_1$ it has the form $S_1 = A_1 \cdot \cos nt$, the modulation signal transmitted from $E_2$ has, at the instant of its transmission, the form $S_2 = A_2 \cdot \cos nt$, and the reference signal at P, at the instant at which $S_1$ and $S_2$ are sent out, has the form $S_0 = A_0 \cdot \cos nt$, where $n$ is the frequency expressed in radians ($n = 2\pi f$) and $A_0$, $A_1$ and $A_2$ represent the amplitudes of the signals and $t$ represents the time. The signals from $E_1$ and $E_2$ are received at P by means of the antenna 8 which is connected to two receivers 9 and 10, which are tuned to the different carrier frequencies of transmitters 2 and 3, respectively, and whose amplification is so controlled that the amplitudes $A_1'$ and $A_2'$, respecitvely, of their output signals $S_1'$ and $S_2'$, respectively, are approximately equal. Both receivers comprise demodulators so that the frequency of their output signals will be the same as that of the generator 1 and have the form $$S_1' = A_1' \cdot \cos n(t - \Delta t_{p11})$$

and $$S_2' = A_2' \cdot \cos n(t - \Delta t_{p21})$$

respectively, $\Delta t_{p11}$ and $\Delta t_{p21}$ being phase angles whose magnitudes correspond to $\Delta t_{p1}$ and $\Delta t_{p2}$, respectively. These output signals are applied, firstly, to a phase comparison meter 11 for determining a first phase difference $$\Delta \phi_1 = n(\Delta t_{p11} - \Delta t_{p21})$$

and secondly, to an addition circuit 12 for forming the sum signal having the form $$S_s = 2A' \cdot \cos n\left(t - \frac{\Delta t_{p11} + \Delta t_{p21}}{2}\right)$$

it here being assumed that, due to the amplification control of receivers 9 and 10, $A_1' = A_2' = A'$. This amplification control can be such as to produce a predetermined approximately equal threshold value in each receiver, or a comparison circuit 13 can be used. Naturally, this amplification control to obtain approximately the same amplitude is not necessary for purposes of the phase measurement in meter 11. The output of the addition circuit 12 is connected to one input of a further phase meter 14 whose other input is connected, via an adjustable phase shifter 20, to the generator 19 which produces the reference signal $S_0$. This second phase meter 14 determines the second phase difference $$\Delta \phi_f = n\left(\frac{\Delta t_{p11} + \Delta t_{p21}}{2}\right)$$

If the signals $S_1'$ and $S_2'$ are not applied to the addition circuit 12 with the same amplitude, the phase meter 14 will determine a phase difference which will differ from $\Delta \phi_f$ by an error angle which is a function of the amplitude ratio $A_1'/A_2'$. If this amplitude ratio can be determined or is known, the phase difference $\Delta \phi_f$ measured by phase meter 14 can be compensated for by applying to the meter a counterbalancing input which corresponds to this error angle. This, it has been found, will in some cases be more expedient than to provide the circuitry necessary for bringing $S_1'$ and $S_2'$ to the same amplitude.

The outputs of the two phase meters 11 and 14 are applied to the two inputs of a multiplication circuit 15 which forms the product $$P_{\phi 1} = \Delta \phi_1 \cdot \Delta \phi_f$$

which gives the magnitude and algebraic sign of $\Delta t_p$. If $\Delta t_p$ is to be given in a desired unit length, this product $P\phi_1$ need simply be multiplied by a factor $$Q = \frac{c}{4\pi^2 \cdot \Delta t_g \cdot f_i^2}$$

i.e., in order to obtain the distance in a given unit of length, the product $$\Delta t_p = P_{\phi 1} \cdot Q$$

has to be formed. This is accomplished by means of a further multiplication circuit 16 one of whose inputs is connected to the output of multiplication circuit 15 and the other of whose inputs is connected to the output of a storage device 17 which contains the value Q. The output of multiplication circuit 16 is connected to an indicator 18.

As described above, the multiplication circuit can form the product $P_{\phi 1}$ out of $\Delta \phi_1$ and $\Delta \phi_f$, wherein $\Delta \phi_1$ represents the phase difference between $S_1'$ and $S_2'$, i.e., $\Delta \phi_1 = n(\Delta t_{p11} - \Delta t_{p21})$, so that the resulting algebraic sign of $P_{\phi 1}$ is positive when $\Delta t_{p1}$ is greater than $\Delta t_{p2}$ and negative when $\Delta t_{p1}$ is smaller than $\Delta t_{p2}$; this gives an indication as to the side of $F_S$ on which the plane $F_P$ lies. This, however, is in many cases not necessary as, for example, when the approximate location of $F_P$ is already known, in which case all that needs to be done is to determine the magnitude of $P_{\phi 1}$. In such a case, then, all that has to be determined is the phase difference between $S_1'$ and $S_2'$, i.e., the absolute magnitude $|\Delta \phi_1|$, which, among other things, has the advantage of simplifying the phase meter 11.

The phase of the reference signal is adjusted by means of the phase shifter 20. The latter makes the phase shift of the reference signal equal to zero when the phase of the reference signal from generator 19, at the instant at which the signals are transmitted from $E_1$ and $E_2$, is in phase with the modulation signals from $E_1$ and $E_2$. In practice, the reference signal will be adjusted at a time when the magnitude, and possibly also the algebraic sign, of the product $P_{\phi 1}$ or the corresponding value of $\Delta t_p$, are known, or can be determined by other means. Naturally, the phase adjustment can also be made if the transit time between one of the fixed stations and P is determined by other means and the reference signal is then adjusted so that its phase will lead the phase of the signal received from the transmitter by a phase angle corresponding to the transit time between such transmitter and the point P.

In order to avoid ambiguity, the angular frequency $n = 2\pi f_i$ should be so low that $\Delta t_{p1}$ and $\Delta t_{p2}$ are under all circumstances smaller than $1/f_i$.

If not only the magnitude but also the algebraic sign of $P_{\phi 1}$ (or of $\Delta t_p$) is to be determined, the signals $S_1'$ and $S_2'$ must be identified on the receiver side. This can be accomplished, as shown in FIGURE 2, by means of two separate receivers 9 and 10 tuned to the transmitters 2 and 3, respectively. Alternatively, the signals can be identified in other ways, for example, by providing different types of modulation for $S_1$ and $S_2$.

If the modulation signals $S_1$ and $S_2$ which are sent out are not in phase with each other but have a predetermined phase relationship, an in-phase relationship between the two signals can be simulated by means of a suitable further phase shifter (not shown) connected to either of the receivers 9 and 10.

As shown in FIGURE 3, the entire system can be inverted, in a manner of speaking, in the sense that the measurement is performed at, or in conjunction with one of the fixed stations, e.g., station $E_2$, in which case a signal $S_3 = A_3 \cdot \cos nt$, modulated onto a carrier, is sent out from P, $A_3$ being the amplitude. This signal is received by antennas 22 and 23 connected to receivers 24 and 25, respectively, which receivers are located at $E_1$ and $E_2$, respectively. The output of receiver 24 is applied to station $E_2$ via a transmission line 6 which may be a radio link and which delays the signal by a time interval corresponding to $2\Delta t_g$, while the output of receiver 24, which itself is located at $E_2$, is delayed by a delay line 21 matched to the transmission line 6 so as to produce a time delay which is also $2\Delta t_g$. The thus delayed signals are then applied to a circuit arrangement similar to that of station P described in conjunction with FIGURE 2, so that there is thus obtained a first phase difference between the signals derived from $E_1$ and $E_2$ and a second phase difference between the reference signal corresponding to $S_3$, and a sum signal obtained from the two signals, whose amplitudes may first have been made equal to each other or which may have been amplified to have a given amplitude ratio. The phase of the reference signal is so adjusted, by means of phase shifter 20, that this reference signal will lag the signal sent out by P by a phase angle corresponding to the transit time caused by the transmission line 6. The two phase differences are then multipled by each other. The thus obtained product can again be multiplied by Q to obtain the distance $\Delta t_p$.

If there are a plurality of individual stations P, the system may be time multiplexed so that the distance of each station P can be determined individually.

According to a third embodiment of the system according to the present invention, the stations at P, $E_1$ and $E_2$ are constituted as transmitter-receiver stations, as shown in FIGURE 4. A signal which is produced by generator 1 and modulated onto a carrier is transmitted from P, and is received and demodulated in $E_1$ and $E_2$ by means of antennas 8 and receivers 9. The outputs of receivers 9 are applied to generators 26 for locking the phases of the signals produced by these generators. These signals are then modulated onto different carriers in transmitters 27 and 28, and are then sent out by antennas 29 and 30, to be received at P whereat they are picked up and processed by a receiving circuit 31 similar to that shown in FIGURE 2. The generator 1 is synchronized with the generator 19 (not shown in FIGURE 4) of circuit 31 by means of a connection 32.

According to another modification of the system, in which the stations at points P, $E_1$ and $E_2$ are again transmitter-receiver stations, station P sends out a signal which signal, however, is picked up only at $E_1$ from whence it is re-transmitted. The signal sent out by $E_1$ is picked up, firstly, at P where, in circuit 31, it is received and demodulated, and secondly, at $E_2$, where it is modulated onto a carrier having a different frequency and then re-transmitted, to be picked up at P, where circuit 31 receives and demodulates the signal. Here, however, the reference signal coming from generator 19 is so adjusted by means of phase shifter 20 (see FIGURE 2) that it lags the phase of the signal from generator 1 by a phase angle corresonding to the transit time $2\Delta t_g$. Furthermore, the signal received in P from $E_1$, prior to being processed, is delayed by an equal phase angle by means of a phase shifter (not shown), which is connected to the output of receiver 9. The amplification of the two receivers in P is adjusted to such threshold values that the amplitudes of their output signals are in a ratio $m = S_1/S_2$.

Figure 5:
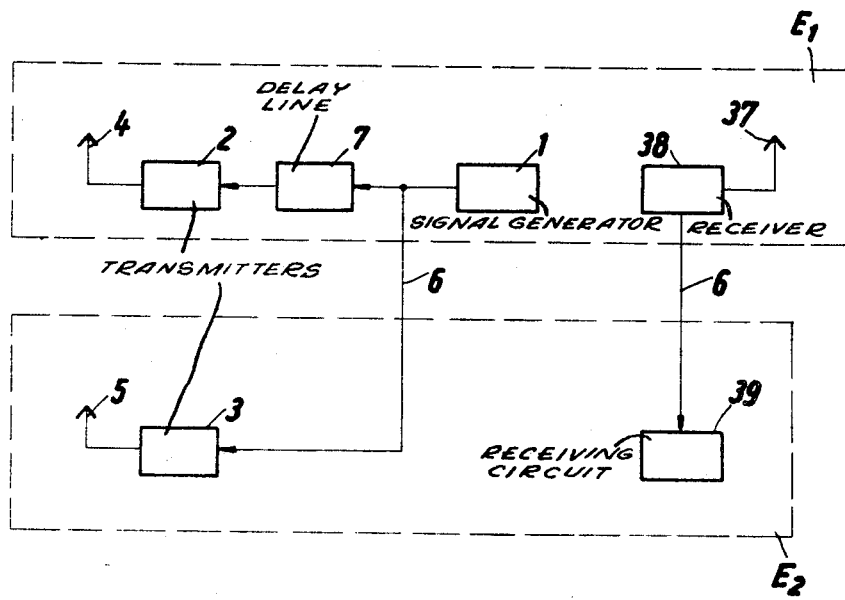
FIGURE 5 is a block diagram of a fourth embodiment of a system according to the instant invention.

According to a further embodiment of the system, shown in FIGURE 5, which likewise represents an inversion of the system and in which the three stations are transmitter-receiver stations, $E_1$ and $E_2$ transmit signals generated by generator 1, which signals are of the same phase and are modulated onto different carriers. These signals are picked up and demodulated at P by means of antenna 32' and receiver 33; the signals are used to phase-lock the signal produced by generator 34 which is connected to a transmitter 35 provided with an antenna 36. The transmitter modulates the signal onto a different carrier and station P sends out the thus modulated signal. The signals are received at $E_1$ and $E_2$ by means of antenna 37, receiver 38 and the circuit 39 which may be similar to the circuit shown in FIGURE 3 for $E_2$. In this case, however, the signal from generator 19 is phase-shifted, by means of phase shifter 20, such that its phase lags the phase of the modulation signal sent out by $E_2$ by a phase angle corresponding to the transit time $2\Delta t_g$.

FIGURE 6 shows a fifth embodiment of a system according to the present invention which is likewise an inversion. Here, a signal modulated onto a carrier is transmitted from $E_1$ via antenna 4; this signal is received, demodulated and modulated onto a carrier of different frequency, and re-transmitted. The thus re-transmitted signal is picked up at $E_1$ and $E_2$, the signal being picked up at $E_2$ by antenna 22 which is connected to receiver 24, and at $E_1$ by means of a circuit 39 as shown in FIGURE 3. Moreover, the signal obtained at $E_2$ is applied to circuit 39 via transmission 6, the circuit 39 also having applied to its signal generator (not shown in FIGURE 6), via transmission line 40 which may be a radio link, a synchronization signal from generator 1. The phase shifter 20 of circuit 39 is so adjusted that the phase meter 14 has applied to it a reference signal the phase of which lags the phase of the signal sent out by $E_1$ by a phase angle corresponding to $2\Delta t_g$. The addition circuit 12 has the signals $S_1$ and $S_2$ applied to it from $E_2$ and delay line 21, which signals will have the amplitude ratio $m$.

In the sixth embodiment illustrated in FIGURE 7, which is likewise an inversion of the system, the signals are, in $E_1$ and $E_2$, modulated onto carriers of different frequency and transmitted while in phase with each other. The signals are received at P, demodulated and modulated onto a carrier of different frequency and re-transmitted. Accordingly, the transmitters at $E_1$ and $E_2$ are equipped with the transmitters 2 and 3, together with the components pertaining thereto. The station at P is provided with two receivers 9 and 10 tuned to receive the signals sent out from $E_1$ and $E_2$ which signals serve, in P, to phase-lock the signals produced by the modulation generators 26, whereupon the signals are modulated onto carriers of different frequency by means of transmitters 27 and 28 whose antennas 29 and 30 send out the signals. The last-mentioned signals are received in $E_1$ by receivers 25 and 26 of a circuit 41 which differs from circuit 39 only that the delay line 21 is replaced by a short-circuit, because, in this embodiment, the transmission 6 having a transit time $2\Delta t_g$ is replaced by line 42 whose length is, for all practical purposes, negligible. The circuit 41 has an addition circuit 12 to which the signals are applied, their amplitude ratio being $m$.

The invention described so far relates only to the determination of the distance between a plane $F_P$ and the plane of symmetry $F_S$ between two points $E_1$ and $E_2$ of known location. It will be appreciated, however, that the position of point P within the plane $F_P$ can be obtained by determining the distance between a second positional plane containing the point P and a second plane of symmetry of two other stations, which second plane of symmetry forms an angle, preferably a right angle, with the first-mentioned plane of symmetry $F_S$. In practice one of the two points pertaining to the second plane of symmetry may coincide with one of the points $E_1$ and $E_2$ defining the first plane of symmetry $F_S$, or the stations relating to both planes of symmetry may otherwise be arranged in any suitable manner so as to form a grid or coordinate system of positional planes so that the location of point P may be definitely fixed, as is fully described in co-pending application Ser. No. 267,306, filed Mar. 22, 1963, of Alexander Prichodjko, Albert Simianer, and Hartmut Hipp, now Patent No. 3,303,500, issued Feb. 7, 1967, and copending application Ser. No. 270,909, filed Apr. 5, 1963, of Alexander Prichodjko.

Figure 8:
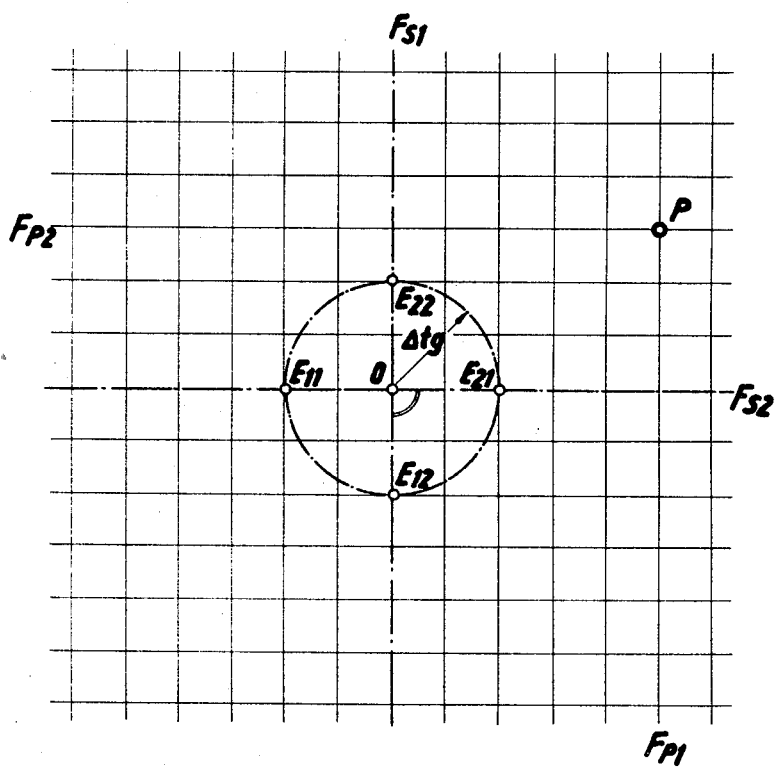
FIGURE 8 is a plan view of a transmitting plane in which there are four fixed points arranged in accordance with the instant invention.

FIGURE 8 shows a system in which the position of point P is to be determined, there being four stations $E_{11}$, $E_{21}$, $E_{12}$ and $E_{22}$. The point P is located in each of two mutually perpendicular positional planes $F_{P1}$ and $F_{P2}$. The points $E_{11}$ and $E_{21}$ correspond to the points $E_1$ and $E_2$ of FIGURE 1 and have a plane of symmetry $F_{S1}$, while $E_{12}$ and $E_{22}$ are two further points having a plane of symmetry $F_{S2}$. The two planes of symmetry are likewise at right angles to each other, so that there is formed a rectangular coordinate grid system. If the position of P in a positional plane which is other than at right angles to the first positional plane is to be determined, the second set of stations $E_{12}$ and $E_{22}$ can simply be shifted, with respect to points $E_{11}$ and $E_{21}$, about the circle having the radius $\Delta t_g$. The stations at points $E_{12}$ and $E_{22}$ may be similar to any of the above-described systems and be used in conjunction with the station at P. In order to avoid interference between the sets of stations, the stations at $E_{12}$ and $E_{22}$ may operate at different carrier frequencies than the stations at $E_{11}$ and $E_{21}$; alternatively, a suitable time multiplex arrangement can be used.

As already indicated above, one of the two points pertaining to one of the planes of symmetry may be made to coincide with one of the two stations pertaining to the other plane of symmetry. Such an arrangement is shown in FIGURE 9 in which the points $E_{21}$ and $E_{22}$ coincide with each other.

In some cases, particularly if there is a shortage of available carrier frequencies, it is advantageous to modulate all of the signals onto the same carrier frequency. It is then expedient to use different modulation frequencies so as to make it possible for the various signals to be identified at the receiver end of the system. It is particularly advantageous if the different modulation frequencies are different harmonics of the same fundamental frequency, and if the reference frequency is also a harmonic thereof. It is then possible to make all frequencies the same at the output end of the system simply by providing frequency dividers and/or multipliers. Such an arrangement is shown in FIGURE 10 which is basically similar to the system of FIGURE 2 and differs therefrom in that the station at $E_2$ is provided with a frequency multiplier 43 and that the transmitters 2 of both $E_1$ and $E_2$ operate at the same frequency, to which the receiver 9 in P is tuned. The demodulated signals, whose frequencies are equal to the output signals of components 7 and 43, are separated in appropriately tuned resonant amplifiers 44 and 45, whose amplification is adjustable by means of a comparison circuit 46.

The other systems described above may be similarly modified, i.e., the arrangements of FIGURES 3, 4, 5, 6, and 7 may be modified to operate at the same carrier frequency throughout.

It is not basically essential that the signals be modulated onto a carrier to permit their being transmitted. For example, the signals can be acoustic signals, e.g., sonar signals, which are transmitted directly and not as modulation signals.

Also, in order to identify the signals at the receiving end, suitable time multiplexing means may be used in the cases where the signals are of the same signal or carrier frequency. Here it is expedient to use, on the receiver side, follower oscillators for bridging the instants at which no signals are received.

The systems described so far involve keeping the phases of the reference signal generators constant with a high degree of accuracy. This entails a fair amount of expense, but according to a further feature of the present invention, this drawback is eliminated by providing an arrangement in which reference signal generators can be used without special means for stabilizing their phase.

Figure 11:
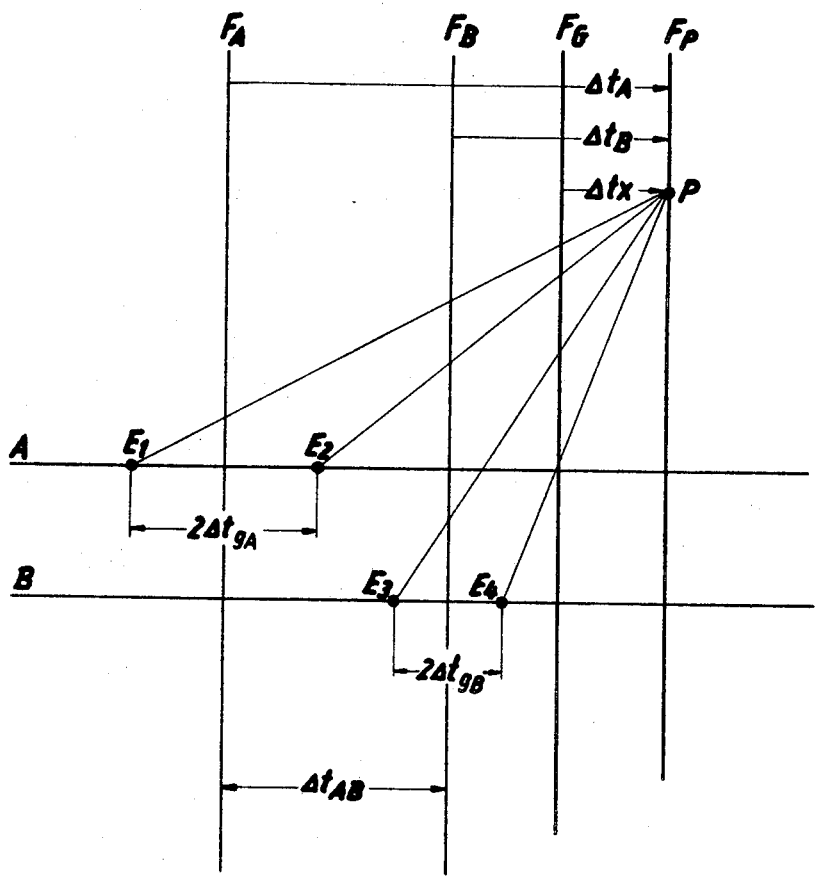
FIGURE 11 is a plan view of a transmitting plane in which there are two pairs of fixed points by means of which the distance between the positional and reference planes is determined.

As shown in FIGURE 11, the distance corresponding to the transit time $\Delta t_x$, which is the distance between the positional plane $F_P$ containing the point P and a predetermined reference plane $F_G$ parallel to $F_P$, is determined by means of the transit times $\Delta t_A$ and $\Delta t_B$. Transit time $\Delta t_A$ corresponds to the distance between $F_P$ and a plane of symmetry $F_A$ of two points $E_1$ and $E_2$, while transit time $\Delta t_B$ corresponds to the distance between $F_P$ and a plane of symmetry $F_B$ of two further points $E_3$ and $E_4$. The points $E_1$ and $E_2$ lie on a line A and are spaced from each other a distance corresponding to the transit time $2\Delta t_{gA}$, while the points $E_3$ and $E_4$ lie on a second line B and are spaced from each other a distance corresponding to the transit time $2\Delta t_{gB}$, the lines A and B being parallel to each other and the planes of symmetry $F_A$ and $F_B$ being spaced from each other a distance corresponding to the transit time $\Delta t_{AB}$. The transit times $\Delta t_A$ and $\Delta t_B$ are determined individually in the manner described above and are then corrected to allow for the distance between $F_G$ and $F_A$ and for the distance between $F_G$ and $F_B$. If the reference signals are not in phase with each other with the requisite degree of accuracy, these corrected values will still have a transit time error. Consequently, the measurement taken with the aid of points $E_1$, $E_2$, will then not yield the actual value $\Delta t_x$, but a value $\Delta t_x + \Delta t_\alpha$, while the value determined by means of stations $E_3$ and $E_4$ will be $\Delta t_x + \Delta t_\beta$, in which case the phase error $\Delta \phi_F$ of the reference signal will be $$\Delta \phi_F = \frac{n \cdot (\Delta t_{x\alpha} - \Delta t_{x\beta})}{\dfrac{\Delta \phi_{112}}{4n \cdot \Delta t_{gA}} - \dfrac{\Delta \phi_{134}}{4n \cdot \Delta t_{gB}}}$$

where $\Delta \phi_{112}$ is the phase difference between the received signals derived from $E_1$ and $E_2$, and $\Delta \phi_{134}$ is the phase difference between the received signals derived from $E_3$ and $E_4$. If $\Delta \phi_F$ is negative, the phase of the inaccurate reference signal lags with respect to that of the true or simulated phase of the received signals. This phase error can either be automatically corrected or be calculated and then corrected.

Figure 12:
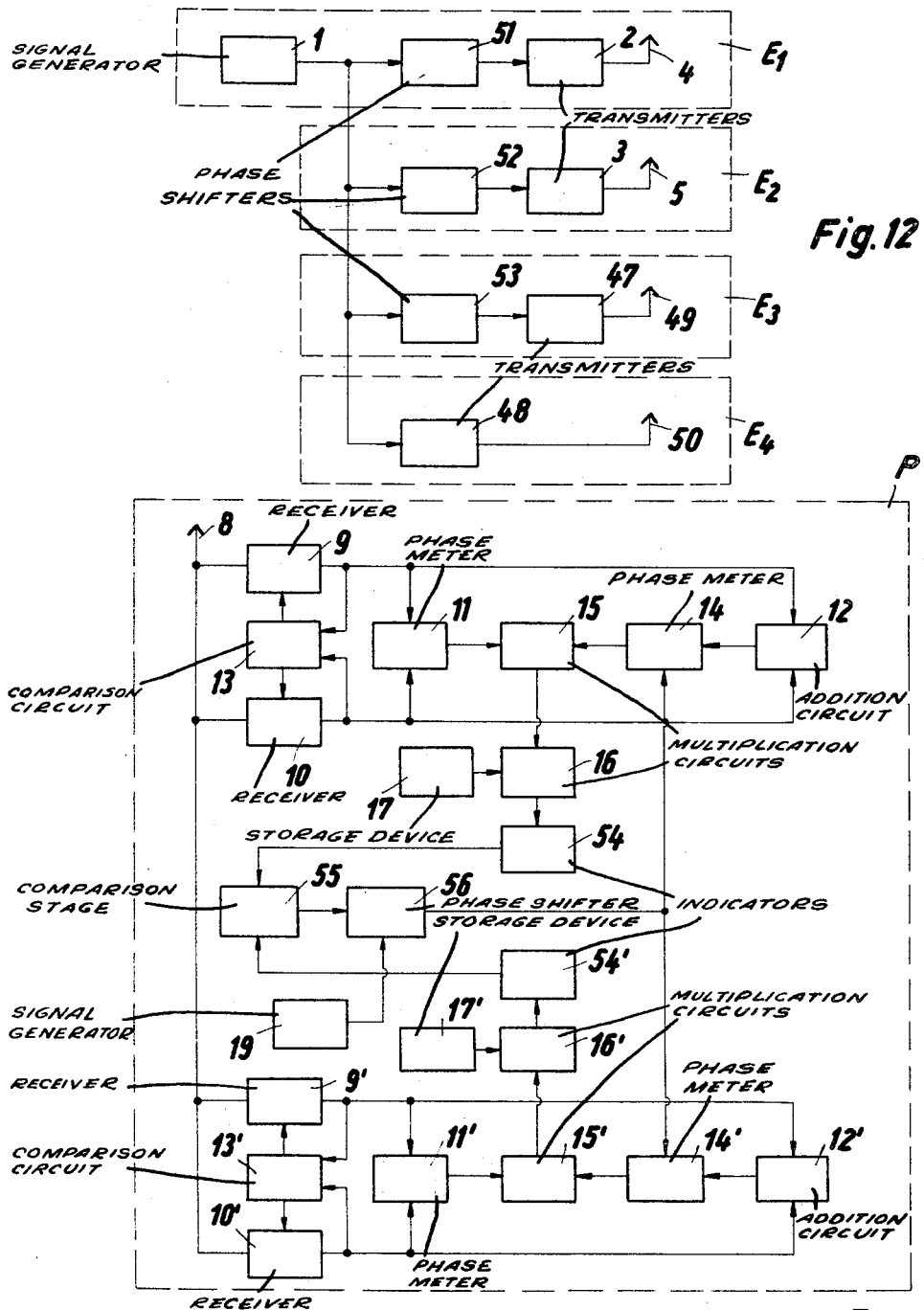
FIGURE 12 is a block diagram of an eighth embodiment of a system according to the present invention.

FIGURE 12 shows a system based on that of FIGURE 2 but expanded to be used in conjunction with four stations $E_1$, $E_2$, $E_3$, $E_4$, as shown in FIGURE 11, which four stations comprise transmitters 2, 3, 47 and 48, respectively, which send out carriers of different frequencies, the four transmitting antennas being shown at 4, 5, 49 and 50, respectively. Three of the stations have phase shifters 51, 52, 53, interposed between the common signal generator and the respective transmitters so that the signals sent out by the four stations will be in phase with each other. The station P contains four receivers 9, 10, 9' and 10' tuned to the carrier frequencies sent out by the transmitters 2, 3, 47 and 48, respectively. For the sake of simplicity, those components in P which are identified by primed reference numerals receive and process the signals received from $E_3$ and $E_4$. The indicators 54 and 54' are so preset that their outputs are related to the reference plane $F_G$ rather than to the planes $F_A$ and $F_B$. These outputs are applied to a comparison stage 55 which controls a phase shifter 56 in such a manner that the values indicated by 54 and 54' are equal to each other.

The equation for $\Delta \phi_F$ can be solved by means of conventional techniques, the value $(\Delta t_{x\alpha} - \Delta t_{x\beta})$ being obtained as the difference between the values indicated by 54 and 54' in station P, the system being as shown in FIGURE 12. Here, the comparison stage 55 can be omitted and phase shifter 56 can be replaced by a phase shifter 20 which can be used to correct the phase of the reference signal by an amount equal to $\Delta\phi_F$. Alternatively, the reference signal may remain uncorrected, in which case a bias or preset value must be applied to the phase meters 14, 14' which is equal to the phase error $\Delta\phi_F$. According to still another possibility, one of the two incorrect values for $P_\phi$ or $\Delta t_x$, as the case may be, can be appropriately corrected, in which case the output signal of phase meter 11 has to be multiplied by $\Delta\phi_F$ and the product obtained by this multiplication be subtracted from the value indicated by indicator 54; the stage 55 can then be omitted.

The error in the output signal of the multiplier 15 can also be corrected as shown in FIGURE 14, in which the difference between the output signals of stages 15 and 15' is formed in stage 57, which difference is then multiplied, in multiplier circuit 58, with the first phase difference, i.e., the output signal of phase meter 11. This product is applied to the dividend input of a quotient-forming stage 59 whose divisor input has applied to it the output of stage 60 which forms the difference between the outputs of stages 11 and 11' (FIGURE 12). The quotient formed by stage 59 is applied to the subtrahend input of a subtraction stage 61, whose other input is connected to the output of stage 15. The output of stage 61 is connected to the input of an indicator 62 which indicates the corrected value of the product obtained by multiplying the first and second phase differences. Here, too, the stage 55 can be dispensed with.

The lines A and B of FIGURE 11 can be made to coincide with each other, as shown in FIGURE 13. This also allows one of the transmitter points pertaining to the plane $F_A$ to coincide with one of the transmitter points pertaining to the plane $F_B$, so that, in FIGURE 13, $E_2$ coincides with $E_3$. Also, the position of the points is such that $\Delta t_{gA} = \Delta t_{gB} = \Delta t_g$; this, however, is not essential for the operation of the system.

Assuming the points $E_1$, $E_2$ and $E_4$, as well as point P, to be located as shown in FIGURE 13, the phase error $\Delta\phi_F'$ of the reference signal will be $$\Delta\phi_F' = \frac{n \cdot (\Delta t_{x\alpha} - \Delta t_{x\beta}) \cdot 4\Delta t_g}{\Delta\phi_{i12} - \Delta\phi_{i24}}$$

wherein $\Delta\phi_{i12}$ is the phase difference between the signals emanating from $E_1$ and $E_2$ and $\Delta\phi_{i24}$ is the phase difference between the signals emanating from $E_2$ and $E_4$.

Figure 15:
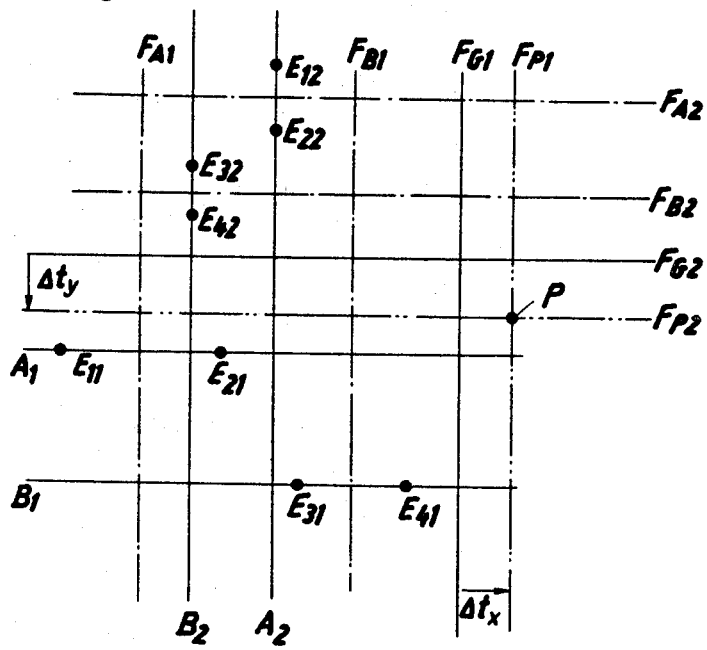
FIGURE 15 is a plan view of a transmitting plane showing a total of eight fixed points for enabling the position of point P to be determined.

According to another feature of the present invention, the system of FIGURE 11 or 13 is expanded for determining $\Delta t_x$ and $\Delta t_y$ in an $(x, y)$ coordinate system in which the $x$-axis and $y$-axis may be at any desired angle but preferably a right angle. Such a right-angle coordinate system is shown in FIGURE 15, in which the point P whose position is to be determined lies in two positional planes $F_{P1}$ and $F_{P2}$, the distance of the latter being determined with respect to planes $F_{A2}$ and $F_{B2}$. A total of eight points $E_{11}$, $E_{21}$, $E_{31}$, $E_{41}$, $E_{12}$, $E_{22}$, $E_{32}$, $E_{42}$, are shown which produce planes of symmetry as described above. In addition to the first reference plane $F_{G1}$ there is a second reference plane $F_{G2}$, both reference planes being at right angles to each other. The distances with respect to the second reference plane $F_{G2}$ are so corrected and the phase of the reference signals so adjusted that the values representing the distance between P and $F_{G1}$ and the distance between P and $F_{G2}$ are equal to each other.

Figure 16:
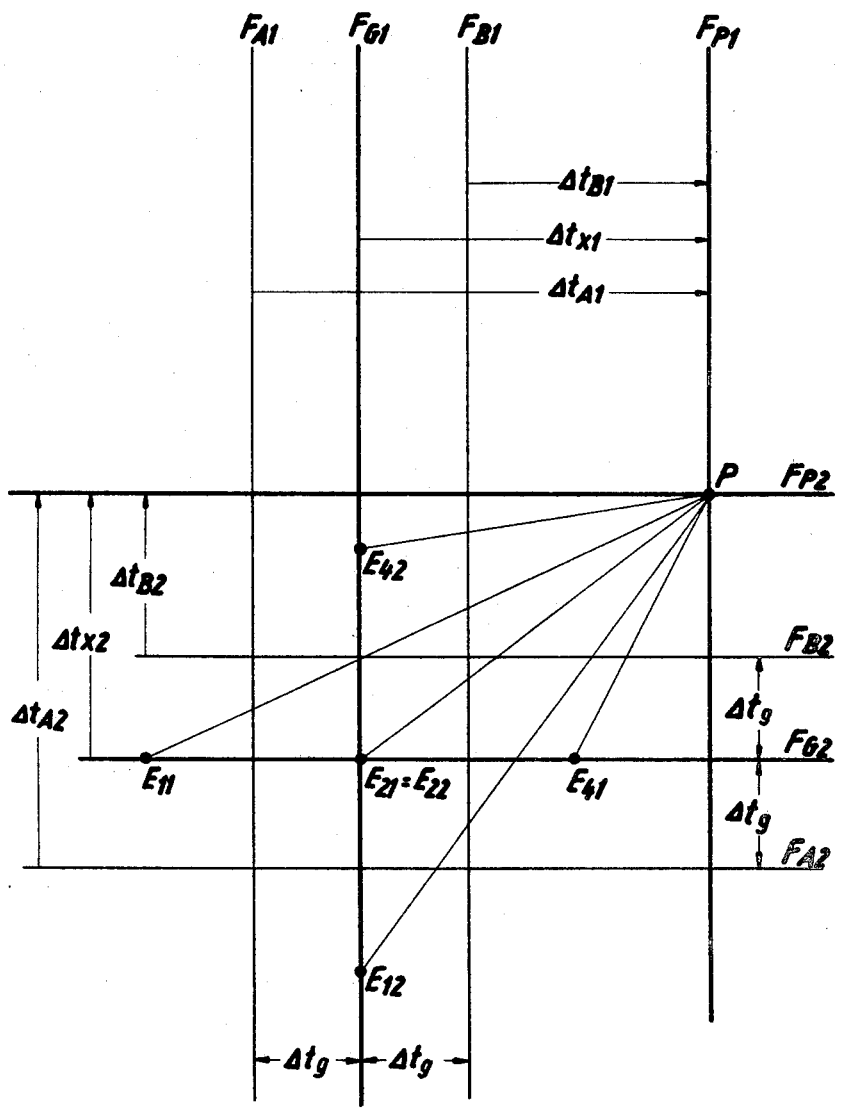
FIGURE 16 is a plan view of a transmitting plane and shows a simplification of the arrangement depicted in FIGURE 15, there being but five fixed points.

The system of FIGURE 15 can be simplified in a manner analogous to that in which the system of FIGURE 11 was simplified as shown in FIGURE 13, namely, by positioning the stations as shown in FIGURE 16 so that there are but three stations extending in any one coordinate, with one of the three stations of the $x$-coordinate coinciding with one of the stations of the $y$-coordinate, there therefore being a total of but five stations. If it is not possible due, for example, to terrain conditions, to arrange the stations as shown in FIGURE 16, they may be positioned so that at least one of the stations pertaining to one pair of stations coincides with one station pertaining to another pair of stations. In any event, the reference signal should be corrected so as to allow the common station or stations to be used for the measurement of both coordinates.

Referring once again to FIGURE 13, the same shows that the two values obtained for the distance of P from reference plane $F_G$, along the $x$-axis, will be the same outside of the region $\overline{E_1 E_4}$ even where the reference signal has a phase error because, throughout this region, the two first phase differences along the $x$-axis will always be constant and not equal to zero. Even though the region in which this occurs—here only two sections of a straight line—will, if P represents an aircraft, be traversed very quickly or perhaps not be traversed at all, the fact that the accurate measurements are obtained even within this region constitutes a not insubstantial advantage.

With the position of P along the $y$-axis being determined in a manner similar to that in which the position along the $x$-axis is determined, i.e., by using three transmitter points, two $y$-values will be obtained which will have a phase error so long as the reference signal has a phase error and P does not lie on the $y$-axis. If the phase of the reference signal is then so shifted that the two $x$-values as well as the two $y$-values are equal to each other, the position of the point may be plotted accurately over the entire range, even on the $x$-axis. Such a system is shown in FIGURE 16 in which the signals of a further set of two additional transmitter pairs and the reference signal are used for determining the point of P along the other coordinate; accordingly, two further products are formed which give the distance, or a value equivalent thereto, between P and the second reference plane which is at right angles to the first reference plane. These products may still contain an error. The phase of the reference signal is so shifted that the values for the distance between P and the first reference plane are equal, and that the values for the distance between P and the second reference plane are equal. The two lines on which lie the transmitter pairs pertaining to each coordinate may coincide with each other, with one transmitter of one pair coinciding with one transmitter of the other pair; furthermore, one transmitter pertaining to the $x$-coordinate may coincide with one transmitter pertaining to the $y$-coordinate.

The phase error $\Delta\phi_F''$ produced in the system shown in FIGURE 16 may be calculated as follows, where the additional subscript 1 refers to the one coordinate and the additional subscript 2 to the other:

$$\Delta\phi_F'' = \frac{n(\Delta t_{x\alpha1} - \Delta t_{x\beta1} + \Delta t_{x\alpha2} - \Delta t_{x\beta2}) 4 \Delta t_g}{\Delta\phi_{i121} - \Delta\phi_{i231} + \Delta\phi_{i122} - \Delta\phi_{i232}}$$

The above equation can be expanded to show how the phase error is calculated if there are, in fact, a total of eight stations. Since, however, the use of eight stations is deemed to be impractical, it is thought unnecessary to set forth the full equation, particularly since the same can readily be derived mathematically. Obviously, the more individual stations can be made to coincide with each other, the less complicated will be the system as a whole and the simpler will be the equation representing the phase error.

In order to obtain an exact coordinate value, it is not absolutely essential to correct the phase of the reference signal. Instead, the second phase difference pertaining to the particular coordinate value can be corrected whereupon the coordinate value, which is now exact, can be determined anew. Alternatively, the known phase error of the reference signal can be used to calculate the error of an incorrect coordinate value and then to correct the incorrect coordinate value. This modification, too, is capable of being inverted in that points E become receivers and the point P a transmitter.

Figure 17:
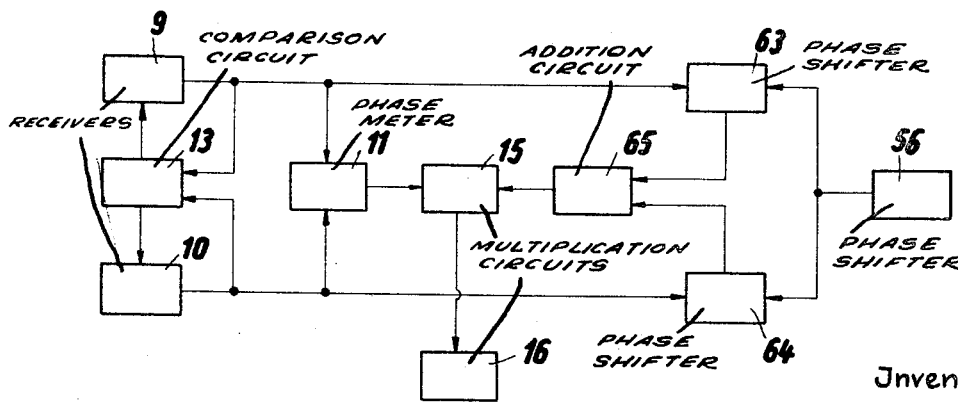
FIGURE 17 is a block diagram of a modified component incorporated in a system according to the present invention.

In the modification shown in FIGURE 17 the second phase difference is not formed from the sum signal derived from the superposition of the first and second informational signals and the reference signal; instead, the second phase difference is formed from the sum of the phase difference between the signal from $E_1$ and the reference signal and the phase difference between the signal from $E_2$ and the reference signal. Accordingly, the system of FIGURE 17 is provided with an addition circuit 65 as well as with phase meters 63 and 64; the multiplier circuit 15, however, is set to put out one half of the product of its inputs.

It will be seen from the above that it is one of the essential features of the present invention that it allows the phase of signals produced at spaced apart points to be exactly synchronized without it being necessary to know the distance between the points. It is thus no longer necessary to provide two time standards, each operating with a high degree of constancy, which time constants are first brought together at one point and are there synchronized, thereafter to be separated and used at different points. In other words, it is possible completely to eliminate the need for expensive time standards. According to the present invention, the phase-corrected reference signal produced at the receiver end by means of conventional oscillators is at least as good as the signal of a time standard, particularly when it is borne in mind that even the best time standards have a certain inaccuracy and must be adjusted from time to time. The phase of the frequency standard can be corrected by bringing it to another frequency standard whereupon the two may be synchronized; if the two time standards are located at spaced apart points, they can be synchronized if the distance between them is known. If the distance is unknown the phase can be corrected by means of the present invention, but since, according to the present invention, a more or less continuous phase correction can be achieved quite simply, the time standard can be dispensed with, and a conventional oscillator having normal accuracy is sufficient. Accordingly, the present invention also includes the provision of any of the above-described systems for the purpose of making two signals, originating from spaced apart points, run in synchronism with each other. It is simplest to determine the ratio $m$ empirically, i.e, with the reference signal being in the correct phase and the distance between the positional plane and the reference plane being known, the ratio is adjusted until a corresponding product is obtained by multiplying the first and second phase differences.

It will be understood that the above description of the present invention is susceptible to various modifications, changes, and adaptations, and the same are intended to be comprehended within the meaning and range of equivalents of the appended claims.

What is claimed is:

1. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
    (a) means for modulating signals of the same frequency and of the same phase onto carriers of different frequency and transmitting the thus modulated carriers from said fixed points, respectively;
    (b) means for producing at point P a reference signal having the same frequency as said signals, the phase of which reference signal is the same as the phase of the signals transmitted from said fixed points at the instant they are transmitted;
    (c) means for receiving and demodulating at P the signals transmitted from said fixed points, and for determining as a first phase difference the phase difference between the two received and demodulated signals;
    (d) means for amplifying the demodulated signals to approximately equal amplitudes, for producing a sum signal from the thus amplified signals, and for determining as a second phase difference the phase difference between said sum signal and said reference signal; and
    (e) means for multiplying said first and second phase differences.

2. A system as defined in claim 1 wherein said means (a) include means for receiving at one of said fixed points the signal transmitted by the other of said fixed points, the thus received signal being utilized to lock the phase of the signal transmitted by said one fixed point.

3. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
    (a) means for modulating signals of the same frequency and of the same phase onto carriers of different frequency and transmitting the thus modulated carriers from said fixed points, respectively;
    (b) means for producing at point P a reference signal having the same frequency as said signals, the phase of which reference signal is the same as the phase of the signals transmitted from said fixed points at the instant they are transmitted;
    (c) means for receiving and demodulating at P the signals transmitted from said fixed points, and for determining as a first phase difference the phase difference between the two received and demodulated signals;
    (d) means for amplifying the demodulated signals to give the same a predetermined amplitude relationship, for producing a sum signal from the thus amplified signals, and for determining as a second phase difference the difference between said sum signal and said reference signal; and
    (e) means for multiplying said first and second phase differences.

4. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, said system comprising, in combination:
    (a) means for modulating signals of the same frequency and of the same phase onto carriers of different frequency and transmitting the thus modulated carriers from said fixed points, respectively;
    (b) means for producing at point P a reference signal having the same frequency as said signals, the phase of which reference signal is the same as the phase of the signals transmitted from said fixed points at the instant they are transmitted;
    (c) means for receiving and demodulating at P the signals transmitted from said fixed points, and for determining as a first phase difference solely the magnitude of the phase difference between the two received and demodulated signals;
    (d) means for amplifying the demodulated signals to approximately equal amplitudes, for producing a sum signal from the thus amplified signals, and for determining as a second phase difference the phase difference between said sum signal and said reference signal; and
    (e) means for multiplying said first and second phase differences.

5. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
  (a) means for modulating a reference signal onto a carrier and transmitting the thus modulated carrier from P;
  (b) means for receiving and demodulating said signal at said two fixed points and for modulating the signal onto carriers of different frequency and transmitting the thus modulated carriers from said fixed points, respectively;
  (c) means for receiving the last-mentioned transmitted signals at P, for demodulating such signals, and for determining as a first phase difference the phase difference between the two received and demodulated signals;
  (d) means for amplifying the demodulated signals to approximately equal amplitudes, for producing a sum signal from the thus amplified signals, and for determining as a second phase difference the difference between said sum signal and said reference signal; and
  (e) means for multiplying said first and second phase differences.

6. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
  (a) means for modulating a signal onto a carrier and transmitting the same from point P;
  (b) means for receiving and demodulating the signal at one of said fixed points, for there modulating the signal onto a carrier of a frequency different from the first-mentioned carrier and transmitting the thus modulated signal;
  (c) means for receiving and demodulating at P the signal sent out by said one fixed point;
  (d) means for receiving and demodulating the signal sent out by said one fixed point at the other of said fixed points, for there modulating the signal onto a carrier of another different frequency and transmitting the thus modulated carrier;
  (e) means for receiving and demodulating at P the signal sent out by said other fixed point;
  (f) means at P for deriving from the signal sent out by P a reference signal which is of the same frequency as the signal transmitted from P, the phase of which reference signal lags with respect to the signal transmitted from P by a phase angle which corresponds to the transit time between said two fixed points;
  (g) means at P for delaying the signal received from said one fixed point by the same phase angle;
  (h) means for determining as a first phase difference the phase difference between the signal received from said other fixed point and the delayed signal received from said one fixed point;
  (i) means for amplifying the demodulated signals to approximately equal amplitudes, for producing a sum signal from the thus amplified signals, and for determining as a second phase difference the phase difference between said sum signal and said reference signal; and
  (j) means for multiplying said first and second phase differences.

7. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
  (a) means for modulating onto carriers of the same frequency signals which are of different harmonics of a common fundamental frequency and for transmitting the modulated signals from said fixed points, respectively;
  (b) means for producing at point P a reference signal which is a harmonic of said fundamental frequency, the phase of which reference signal is such that, in the case of a frequency equalization of all three signals, it is in phase with the signals sent out by said fixed points at the instant of their transmission;
  (c) means for receiving and demodulating at P the signals transmitted from said fixed points, for making all three frequencies equal to each other, and for determining as a first phase difference the phase difference between the two received and demodulated signals;
  (d) means for producing a sum signal from the signals received at P and for determining as a second phase difference the phase difference between said sum signal and said reference signal; and
  (e) means for multiplying said first and second phase differences.

8. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
  (a) means for modulating a signal onto a carrier and transmitting the thus modulated signal from P;
  (b) means for receiving and demodulating said signal at each of said fixed points;
  (c) means for transmitting the signal received at one of said fixed points to the other of said fixed points;
  (d) means for delaying at said other fixed point the signal received from P by a time interval corresponding to the transit time between said two fixed points;
  (e) means for producing at said other fixed point a reference signal whose phase lags with respect to the phase of the signal transmited by P by a phase angle corresponding to the transit time between said two fixed points;
  (f) means at said other fixed point for determining as a first phase difference the phase difference between the delayed signal received from P and the signal received from said one fixed point;
  (g) means for producing a sum signal from the last-mentioned signals and a second phase difference, the phase difference between said sum signal and said delayed reference signal; and
  (h) means for multiplying said first and second phase differences.

9. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
  (a) means modulating a signal onto carriers of different frequency and transmitting the thus modulated carriers from said fixed points, respectively, such that the signals transmitted by both points are in phase with each other;

(b) means for receiving and demodulating at P the signals transmitted by said fixed points, and for modulating such signals onto carriers of different frequency and re-transmitting them from P;

(c) means for receiving the signals transmited by P at said two fixed points, respectively;

(d) means for transmitting the signal received at one of said fixed points to the other of said fixed points;

(e) means for delaying the signal from P received at said other fixed point by a time interval corresponding to the transit time between said two fixed points;

(f) means for deriving, at said other fixed point, a reference signal whose phase lags with respect to the phase of the signal transmitted from said other fixed point by a phase angle corresponding to the transit time between said two fixed points;

(g) means at said other fixed point for determining as a first phase difference the phase difference between the delayed signal received from P and the signal received from said one fixed point;

(h) means for producing a sum signal from the last-mentioned signals and for determining as a second phase difference the phase difference between said sum signal and said delayed reference signal; and (i) means for multiplying said first and second phase differences.

10. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:

(a) means for modulating a signal onto a carrier and transmitting the thus modulated carirer from one of said fixed points;

(b) means for receiving and demodulating at P the signal transmitted by said one fixed point, and for modulating such signal onto a carrier of different frequency and re-transmitting the signal from P;

(c) means for receiving and demodulating at both of said fixed points the signal transmitted from P;

(d) means for transmitting the signal received at the other of said fixed points to said one fixed point;

(e) means for delaying the signal from P received at said one fixed point by a time interval corresponding to the transit time between said fixed points;

(f) means for deriving, at said one fixed point, a reference signal whose phase lags with respect to the phase of the signal transmitted from said one fixed point by a phase angle corresponding to the transit time between said two fixed points;

(g) means at said one fixed point for determining as a first phase difference the phase difference between the delayed signal received from P and the signal recevied from said other point;

(h) means at said one fixed point for amplifying the two last-mentioned signals to give the same a predetermined amplitude relationship $m$, for producing a sum signal from the thus amplified signals, and for determining as a second phase difference the phase difference between said sum signal and said reference signal; and (i) means for multiplying said first and second phase differences.

11. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:

(a) means for modulating signals of the same frequency and of the same phase onto carirers of different frequency and transmitting the thus modulated carriers from said two fixed points, respectively;

(b) means for receiving and demodulating at P the signals transmitted from said fixed points, and for modulating such signals onto carriers of different frequency and re-transmitting them from P;

(c) means for receiving and demodulating the two signals sent out by P at one of said fixed points;

(d) means at said one fixed point for determining as a first phase difference the phase difference between the two received and demodulated signals;

(e) means at said one fixed point for amplifying the two last-mentioned signals to give the same a predetermined amplitude relationship $m$, for producing a sum signal from the thus amplified signals, and for determining as a second phase difference the phase difference between said sum signal and a reference signal, the latter being constituted by the signal originally transmitted by said one fixed point; and (f) means for multiplying said first and second phase differences.

12. An arrangement incorporating (1) two systems, each system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, each system comprising, in combination:

(a) means for modulating signals of the same frequency and of the same phase onto carriers of different frequency and transmitting the thus modulated carriers from said fixed points, respectively;

(b) means for producing at point P a reference signal having the same frequency as said signals, the phase of which reference signal is the same as the phase of the signals transmitted from said fixed points at the instant they are transmitted;

(c) means for receiving and demodulating at P the signals transmitted from said fixed points, and for determining as a first phase difference the phase difference between the two received and demodulated signals;

(d) means for amplifying the demodulated signals to approximately equal amplitudes, for producing a sum signal from the thus amplified signals, and for determining as a second phase difference the phase difference between said sum signal and said reference signal; and (e) means for multiplying said first and second phase differences;

(2) the two planes of symmetry of said two systems forming an angle with each other.

13. An arrangement as defined in claim 12 wherein one of the fixed points pertaining to one of said planes of symmetry coincides with one of the fixed points pertaining to the other of said planes of symmetry.

14. An arrangement incorporating (1) two systems, each system operating on the transmit time principle for determining both the distance which a positional plane $F_P$ containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, each system comprising, in combination:

(a) means for modulating signals of the same frequency and of the same phase onto carriers of different frequency and transmitting the thus modulated carriers from said fixed points, respectively;
(b) means for producing at point P a reference signal having the same frequency as said signals, the phase of which reference signal is the same as the phase of the signals transmitted from said fixed points at the instant they are transmitted;
(c) means for receiving and demodulating at P the signals transmitted from said fixed points, and for determining as a first phase difference the phase difference between the two received and demodulated signals;
(d) means for amplifying the demodulated signals to approximately equal amplitudes, for producing a sum signal from the thus amplified signals, and for determining as a second phase difference the phase difference between said sum signal and said reference signal; and
(e) means for multiplying said first and second phase differences;
(2) the two planes of symmetry of said two systems being in parallel spaced relationship so that two measurements of the distance of the positional plane with respect to two planes of symmetry are obtained;
(3) means for relating said two planes of symmetry to a single common reference plane; and
(4) means for adjusting the phases of the reference signals of said two systems until the distance between the positional plane and said common reference plane, as measured by both systems, is the same.

15. An arrangement as defined in claim 14, further comprising means for determining the error with which the distance is determined and for correcting such error.

16. An arrangement as defined in claim 14 wherein the line joining the two fixed points pertaining to one of the planes of symmetry coincides with the line joining the two fixed points pertaining to the other of the planes of symmetry so that all fixed points of the arrangement lie along a common straight line.

17. An arrangement as defined in claim 16 wherein one of the fixed points pertaining to said one plane of symmetry coincides with one of the fixed points pertaining to said other plane of symmetry.

18. An installation incorporating
(A) two arrangements each of which includes
 (1) two systems, each system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, each system comprising, in combination:
  (a) means for modulating signals of the same frequency and of the same phase onto carriers of different frequency and transmitting the thus modulated carriers from said fixed points, respectively;
  (b) means for producing at point P a reference signal having the same frequency as said signals, the phase of which reference signal is the same as the phase of the signals transmitted from said fixed points at the instant they are transmitted;
  (c) means for receiving and demodulating at P the signals transmitted from said fixed points, and for determining as a first phase difference the phase difference between the two received and demodulated signals;
  (d) means for amplifying the demodulated signals to approximately equal amplitudes, for producing a sum signal from the thus amplified signals, and for determining as a second phase difference the phase difference between said sum signal and said reference signal; and
  (e) means for multiplying said first and second phase differences;
 (2) the two planes of symmetry of said two systems being in parallel spaced relationship so that two measurements of the distance of the positional plane with respect to two planes of symmetry are obtained;
 (3) means for relating said two planes of symmetry to a single common reference plane; and
 (4) means for adjusting the phases of the reference signals of said two systems until the distance between the positional plane and said common reference plane, as measured by both systems, is the same;
(B) the common reference plane of one of said arrangements forming an angle with the common reference plane of the other of said arrangements.

19. An installation as defined in claim 18 wherein, within at least one of the arrangements, one of the fixed points pertaining to one plane of symmetry coincides with one of the fixed points pertaining to the other plane of symmetry.

20. An installation as defined in claim 18 wherein a fixed point pertaining to one of said arragnements coincides with a fixed point pertaining to the other of said arrangements.

21. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
(a) means for modulating signals of the same frequency and of the same phase onto carriers of different frequency and transmitting the thus modulated carriers from said fixed points, respectively;
(b) means for producing at point P a reference signal having the same frequency as said signals, the phase of which reference signal is the same as the phase of the signals transmitted from said fixed points at the instant they are transmitted;
(c) means for receiving and demodulating at P the signals transmitted from said fixed points, and for determining the phase difference between the two received and demodulated signals;
(d) means for determining the phase difference between one of the demodulated signals and said reference signal as well as the phase difference between the other of the demodulated signals and said reference signal, and for adding the two last-mentioned phase differences to obtain a sum phase difference; and
(e) means for multiplying the phase difference between said two received and demodulated signals by said sum phase difference and by a factor of one-half.

22. A system operating on the transit time principle for determining both the distance which a positional plane $F_P$, containing a point P whose position is to be determined, is spaced from the plane of symmetry $F_S$ of two fixed points $E_1$ and $E_2$ which themselves are spaced a known distance from each other, as well as the particular side of the plane of symmetry on which the positional plane is located, said system comprising, in combination:
(a) means for producing two signals of the same frequency and phase and transmitting the same from said two fixed points, respectively;

(b) means for producing at P a reference signal having the same frequency as the signals transmitted from said fixed points at the instant they are transmitted;

(c) means for receiving at P the signals transmitted from said fixed points and for determining as a first phase difference the phase difference between the two received signals;

(d) means for amplifying the received signals to approximately equal amplitudes, for producing a sum signal from the thus amplified signals, and for determining as a second phase difference the phase difference between said sum signal and said reference signal; and (e) means for multiplying said first and second phase differences.

23. A system as defined in claim 22 wherein said signals are time-multpilexed to permit individual identification thereof.

References Cited
UNITED STATES PATENTS

| | | | |
|---|---|---|---|
| 2,991,011 | 7/1961 | Schuck | 235—150.272 |
| 3,020,545 | 2/1962 | Losher | 235—150.272 X |
| 3,150,366 | 9/1964 | Hanna et al. | 343—105 X |

MALCOLM A. MORRISON, *Primary Examiner.*

MARTIN P. HARTMAN, *Assistant Examiner.*